United States Patent

Stephenson et al.

[11] Patent Number: 5,472,498
[45] Date of Patent: Dec. 5, 1995

[54] LIGHTWEIGHT CONCRETE

[75] Inventors: Neville C. Stephenson; Gary P. Norton, both of New South Wales, Australia

[73] Assignee: BST Holdings PTY. Limited, New South Wales, Australia

[21] Appl. No.: 190,180
[22] PCT Filed: Aug. 4, 1992
[86] PCT No.: PCT/AU92/00407
 § 371 Date: May 10, 1994
 § 102(e) Date: May 10, 1994
[87] PCT Pub. No.: WO93/02985
 PCT Pub. Date: Feb. 18, 1993

[30] Foreign Application Priority Data

Aug. 8, 1991 [AU] Australia .................. PK7657

[51] Int. Cl.⁶ .................. C04B 20/10; C04B 16/08
[52] U.S. Cl. .................. 106/672; 106/409; 106/500; 106/502; 106/677; 106/218; 106/236; 106/278; 428/403; 428/407
[58] Field of Search .................. 106/672, 677, 106/409, 500, 502, 218, 273.1, 236, 278; 428/403, 407; 427/244

[56] References Cited

U.S. PATENT DOCUMENTS

| 4,332,620 | 6/1982 | Quinn | 523/220 |
| 4,451,529 | 5/1984 | Kerr, III et al. | 427/244 |

FOREIGN PATENT DOCUMENTS

| 154540 | 7/1980 | Australia . |
| 339343 | 11/1989 | European Pat. Off. . |
| 51-079118 | 7/1976 | Japan . |
| 55-023793 | 6/1980 | Japan . |
| 2018806 | 10/1979 | United Kingdom . |

*Primary Examiner*—Mark L. Bell
*Assistant Examiner*—Michael Marcheschi
*Attorney, Agent, or Firm*—Leydig, Voit & Mayer

[57] ABSTRACT

A lightweight aggregate comprising free-flowing particles of a polymer foam coated with a binding agent having dispersed therein, in total, at least 10% by weight thereof of one or more transition metal ions.

31 Claims, No Drawings

LIGHTWEIGHT CONCRETE

FIELD OF THE INVENTION

This invention relates to improved light weight aggregate for use in the production of building materials such as cementitious products, gypsum products, plaster boards and the like. The invention further relates to construction materials incorporating the aggregate, and to methods of manufacture of lightweight aggregate and of products incorporating the aggregate.

PRIOR ART

The preparation of low density concrete by incorporation of light weight aggregates such as vermiculite, cork, slag, asbestos, bagasse and the like in a hydraulic binder such as a cement/sand/water mixture is well known. Low density concrete having much improved characteristics may be prepared by incorporation of foam particles, for example polystyrene foam, as the light weight aggregate. However cementitious materials do not readily bond with these light weight aggregates which are hydrophobic. In use of polystyrene foam particles (which are by nature highly hydrophobic) it has been proposed to incorporate a binding agent in the cement, or to pre-coat the particles with a binding agent, the purpose of which is to promote adhesion between the foam particles on the one hand and cement on the other.

Various binding agents have been proposed including bituminous products, coal tars and mixtures of pitch with epoxy resins or phenolic resins. These binding agents are believed to act by softening the surface of the expanded polystyrene particles, thereby enhancing the bond strength between the particles and cured concrete.

The use of such materials has suffered from the disadvantages that bituminous and tar-like products when applied to polystyrene particles tend to result in a tacky surface causing the particles to coalesce into a mass which is difficult to disperse. Furthermore, the coatings have a strong bituminous odour which in the past has been detectable in the end product. More importantly the bonding strength between the polystrene foam particles and cured cement has been less than is desired.

Because the binder is tacky, it is usual to coat the polystyrene with binder in a mixer and then add cement and water to the same mixer to form concrete, so avoiding handling of the tacky aggregate. Alternatively the tacky aggregate has been detackified by subsequently dusting the bituminous coated polystyrene balls, in situ, with a finely granulated substance such as cement powder and then adding further cement and water for compression into moulds.

SUMMARY OF THE INVENTION

It is an object of the present invention to provide an improved light weight aggregate which avoids or at least ameliorates disadvantages of the prior art and which in preferred embodiments provides enhanced bonding between the aggregate and cementitious material. By enhanced bonding is meant a greater bond strength than obtainable with prior art light weight aggregates.

According to one aspect, the present invention consists in a light weight aggregate comprising light weight porous particles coated with a binding agent, said binding agent including at least 10% by weight thereof of one or more transition metal ions. The transition metal ion may be selected from the group commonly known as transition metals such as cobalt and chromium and this group also includes all known oxidation states of the transition metal. The transition metal ion may be in an ionic compound or complex.

In preferred embodiments of the light weight aggregate the porous particles are expanded polystyrene foam particles of from 0.5 to 15 mm average diameter and may be balls, beads, pellets or reclaimed particles. The preferred binding agent is a bitumen which is applied to the surface of the polystyrene particles from aqueous emulsion. The transition metal ion is desirably ferric ion present as iron oxide which is suspended in the aqueous phase of the bituminous emulsion by use of viscosity modifying agents prior to application of the emulsion to the polystyrene particles.

Desirably also the emulsion contains surfactants and dispersing agents which are bound to the polystyrene particles with the binder.

Polystyrene balls coated with the binder of the invention are free flowing. They may be incorporated directly into a hydraulic cementitious mixture or may be packaged, stored, transported and subsequently incorporated in a concrete mixture for example at a construction site. The polystyrene balls carry a unique "chemical package" which enables them to disperse evenly and to strongly bond to the cementitious material without the necessity to add further chemicals for this purpose. Concrete which contains aggregate according to the invention is of a surprisingly high compressive strength to weight ratio and has other improved properties in comparison with prior art.

The exact mechanism whereby the presence of the iron oxide increases the binding strength between the cement and the aggregate is not certain. Portland cement is a calcium alumino silicate powder which sets as a solid mass on treatment with water. Prior to addition of water it consists mainly of a mixture of calcium silicates ($Ca_2 SiO_4$ and $Ca_3 SiO_5$) and calcium aluminate ($Ca_3 Al_2O_6$). When treated with water the aluminate hydrolyses to form calcium and aluminium hydroxides which react further with the calcium silicates to form intermeshing crystals of calcium alumino silicates. It is hypothesised that in aggregates according to the present invention, bonding between the calcium alumino silicates and the polystyrene is strengthened by the formation of stable bonds between ferric iron and the donor groups of the polystyrene on the one hand (using pi bonds) and with silica and alumina on the other (using coordinate bonds).

Thus it is well known that iron forms numerous compounds with oxygen and other inorganic donors such as hydrated $Fe(H_2O)_6^{++}$ and $Fe_2(OH_2)(H_2O)_8^{+4}$. Likewise it is well known that ferrous ion forms extremely strong complexes with organic molecules as exemplified by haemoglobin and ferrocene. It is believed that the iron forms a similar bridging function in the present invention when aggregate according to the invention is incorporated into a cementitious mixture. Another possibility is that the transition metal ion compound crystal structure aids in physical interlocking between the polystyrene and the cement.

Scanning electron microscopy has shown a localisation of iron atoms around the polystyrene beads/granulate. This confirms the bonding role of iron, whether it be through transition metal bonding, the formation of crystalline phases which add strength to the cement, or some alternative mechanism. Similar mechanisms are believed to be involved when other transition metals are employed.

BEST MODES OF PERFORMING THE INVENTION

Various embodiments of the invention will now be more particularly described by way of example only.

According to the invention a light weight particulate material is first selected. The preferred material is a closed cell foamed particulate material such as an expanded polystyrene foam. The polystyrene is typically in bead or spherical-shape but irregular particles such as those obtainable by breaking up or recycling waste polystyrene foam (with the correct grading procedure) are also suitable. Particles of other material such as cork, vermiculite, pearlite, blast furnace slag, bagasse and similar light weight aggregate material as well as other foamed polymers may be selected for use in cementitious products wherein the required performance criteria are less stringent than for concrete.

The preferred closed cell foam polystyrene balls may be, for example, 0.5 to 15 mm in diameter, more preferably from 3 to 5 mm in diameter and typically have a density of from 12 to 20 kg per cubic meter, more preferably from 14 to 18 kg per cubic meter. However the density of the polystyrene foam is not critical.

The polystyrene balls are coated with a binding agent. The binding agent is preferably a bitumen or tar but may be a suitable polymer or resin of natural or synthetic origin. Examples include phenolic resins, shellac, epoxy resins, polyvinyl acetate or the like. A preferred binding agent is a bituminous toluene soluble mixture of phenolic and alkyl substituted aliphatic, aromatic, and hetero aromatic compounds of molecular weight range 500–1000 and having a softening point of 40°–45° C. The binding agent acts to bind iron oxide to the surface of the polystyrene particles and to reduce the hydrophobicity of the polystyrene.

For preference the binding agent is emulsified in water in suitable agitation apparatus for example a homogenizer.

A surfactant is desirably added. The surfactants are believed to perform at least two important functions. One is to aid in the emulsification of the bitumen. However surfactants bound to the polystyrene by the bitumen are also believed to aid dispersion of the aggregate in cement. The quantity of surfactant used is therefore greater than that merely required for emulsification per se. A wide variety of anionic, cationic or non-ionic surface active agents are useful for the invention. Anionic agents are preferred. Suitable anionic agents include alkyl and aryl sulphonates such as those sold under the Alkanol trade marks. Sodium lignosulphonates and saponified resin anionic surfactants are preferred.

In preparation of the aggregate of the invention a transition metal compound is dispersed in the aqueous phase of the emulsion. The preferred transition metal compound is a transition metal oxide and preferably ferric oxide. The contribution of the ferric ion to bonding has been discussed above. It is also believed that when an iron oxide is used, the presence of the oxide ions impedes diffusion of carbon dioxide through concrete in which the aggregate is incorporated. Carbon dioxide normally reacts with cement lime to produce calcite thus lowering the pH and contributing to the corrosion of metals used as reinforcement in concrete construction. When transition metal oxides are present in the aggregate the carbon dioxide reacts with the oxide anions to form carbonate ions, thus reducing the carbonation corrosion. The iron oxide is desirably present in the form of a metal oxide pigment. Other transition metal compounds such as chromium, cobalt and nickel, for example as oxides or salts or complexes may also be used. A viscosity moderator or thickening agent is employed to maintain the iron oxide in suspension. A suitable viscosity modifying agent is a modified cellulosic compound such as an alkyl carboxy cellulose. In order to prevent precipitation of iron oxide from the emulsion it is desirable to increase the viscosity to approximately 25 Pascal seconds.

In a preferred embodiment the emulsion used to coat the light weight particulate material comprises from 30–45 parts by weight of a non-aqueous dispersed phase and from 70 to 55 parts by weight of the emulsion of aqueous phase. More preferably the dispersed phase is from 35–40 parts by weight of the emulsion. The non-aqueous phase is a toluene soluble mixture of phenolic and alkyl substituted aliphatic aromatic and heteroaromatic compounds of molecular weight range 500–1000 with a softening point of 40°–45° C. In a preferred embodiment the aqueous phase consists of approximately 50 parts of water with 2 parts of high molecular weight phenolic and acidic compounds viz. abietic acid, neutralised with sodium hydroxide to form an anionic emulsifying agent. The aqueous phase has dispersed therein approximately 5 to 20 parts by weight of the aqueous phase of metal oxide pigment, and approximately 1–2 parts by weight of the aqueous phase of modified cellulosic compounds (such as carboxy methyl cellulose) to increase the viscosity and to stabilize the suspension. An orthoxinol or other fungicide (0.05 parts) and 0.05 parts of a fragrance are optionally included. The bituminous phase is then emulsified in the aqueous phase. The viscosity of the resultant emulsion should be such that there is no apparent settling of the solid and the product is just able to be poured. The pH of the final formulation should be in the range pH 9–pH 10 for preference. Before application to the surface of the expanded polystyrene balls, the emulsion is diluted with water on a 1 to 1 basis and then mixed with the balls.

The transition metal oxide comprises at least 10% by dry weight of the binder. In a preferred emulsion from 5 to 15% of the emulsion by weight is iron oxide. As from 40–60% of the emulsion is water, the iron oxide as a percentage of the bitumen phase is in the range of from about 10 to about 50% of the weight of the dry bitumen. The iron oxide may be in the form of a mineral pigment.

The following are examples of formulations according to the invention wherein:

Visual Resin (Vinsol) is an anionic surfactant available from Hercules Inc.

Methocell is hydroxypropyl methyl cellulose, available from Dow Chemicals, Inc.

Dowicide A is the sodium salt of ortho-phenyl phenol, available from Dow Chemicals, Inc.

The PVA emulsion (of Example 6) is a 50% solids emulsion, such as Vinamul 63-076, available from A. C. Hatricks Australia Pty. Ltd.

The phenolic prepolymer (of Example 7) is available as Resinox Mg 1350, available from Chemplex Pty. Ltd.

The styrene-acrylic emulsion containing 50% solids (of Example 8) is Acrocryl 822 or Acrocryl 921, available from A.C. Hatricks Australia Pty. Ltd.

| Example 1 | | Example 2 | |
| --- | --- | --- | --- |
| Bitumen | 33.50 kg | Bitumen | 35.50 kg |
| Water | 51.00 | Water | 48.00 |
| Chromium trioxide | 12.00 | Cobaltic oxide | 13.00 |
| Vinsol resin | 2.00 | Vinsol resin | 2.00 |

-continued

| | | | |
|---|---|---|---|
| Methocel | 1.00 | Methocel | 1.00 |
| Sodium hydroxide | 0.25 | Sodium hydroxide | 0.25 |
| Dowicide A | 0.15 | Dowicide A | 0.15 |
| Fragrance | 0.10 | Fragrance | 0.10 |
| | 100.00 kg | | 100.00 kg |

| Example 3 | | Example 4 | |
|---|---|---|---|
| Bitumen | 36.50 kg | Bitumen | 35.00 kg |
| Water | 51.00 | Water | 57.00 |
| Iron oxide | 9.00 | Iron Oxide | 5.00 |
| Vinsol resin | 2.00 | Vinsol resin | 1.75 |
| Methocel | 1.00 | Methocel | 1.00 |
| Sodium hydroxide | 0.25 | Sodium hydroxide | 0.25 |
| Dowicide A | 0.15 | | |
| Fragrance | 0.10 | | 100.00 kg |
| | 100.00 kg | | |

| Example 5 | | Example 6 | |
|---|---|---|---|
| Bitumen | 32.00 kg | PVA emulsion | 35.50 kg |
| Water | 45.00 | [50% solids] | |
| Nickel Sulfate | 20.00 | Water | 48.00 |
| Vinsol resin | 1.75 | Iron Oxide | 15.00 |
| Methocel | 1.00 | Vinsol resin | 3.00 |
| Sodium hydroxide | 0.25 | Methocel | 1.00 |
| | | Sodium hydroxide | 0.30 |
| | 100.00 kg | Dowicide A | 0.20 |
| | | | 100.00 kg |

| Example 7 | | Example 8 | |
|---|---|---|---|
| Phenolic Prepolymer | 10.00 kg | Styrene-Acrylic emulsion | 20.00 kg |
| Water | 70.00 | [50% solids] | |
| Chromium oxide | 15.00 | Water | 60.00 |
| Vinsol resin | 3.00 | Iron oxide | 15.00 |
| Methocel | 1.50 | Vinsol resin | 3.00 |
| Sodium hydroxide | 0.30 | Methocel | 1.50 |
| Dowicide A | 0.20 | Sodium hydroxide | 0.30 |
| | | Dowicide A | 0.20 |
| | 100.00 kg | | 100.00 kg |

A preferred method for manufacture of the coating material of examples 1 to 5 is as follows:

The bitumen is first pre-heated to 140° C. and the water is heated to approximately 60° C. The surfactant is dispersed in the water and then the viscosity modifier is added to the solution taking care to avoid the formation of lumps. The transition metal oxide is next added to the aqueous phase with high speed mixing and is dispersed completely. A fragrance and fungicide are next added to the aqueous phase and dissolved. The hot bitumen is then emulsified in the aqueous phase. After emulsification is completed, the mixture is allowed to cool to ambient temperature. The final emulsion has a viscosity of approximately 25±5 Pascal seconds after approximately 24 hours. There should be no settling of the transition metal oxides.

In the case of Examples 6 to 8 the resin is pre-emulsified prior to addition to the viscosity modifier or an emulsion of suitable viscosity is selected prior to disposal of the transition metal oxide.

The aggregate is coated with the emulsion by conventional means. The ratio of coating composition to aggregate varies according to the aggregate selected, the solids content of the emulsion, the humidity on the day of application and such like factors. However a satisfactory ratio of coating solids to aggregate can readily be determined by making samples of concrete using various ratios of coating solids to aggregate and then testing the samples for compressive strength.

Calcium carbonate is desirably added to the coated aggregate during or immediately following the coating process. Calcium carbonate adheres to the treated aggregate.

The light weight aggregate particles when coated with the emulsion and dried are free flowing and may be stored without agglomeration.

The aggregate can be used in the manufacture of low density concrete by adding the light weight aggregate of the invention to the sand/cement/water mix in a manner similar to the addition of stone or gravel aggregate.

A continuous curve can be graphed which relates compressive strength (MPa) to density (Kg/Cu.M) of light weight concrete incorporating the aggregate of the invention. Densities vary from 300 kg per cubic meter to 1800 kg per cubic meter and related compressive strengths vary from 0.5 MPa to 25 MPa. The mix designs corresponding to these various densities and compressive strengths involve a high cement content and low water/cement ratio. The cement content in various mixes varies from 200 kg per cubic meter to 550 kg per cubic meter and have a water/cement ratio of 0.4 or less. These quantities may be compared with standard concrete in which compressive strengths are from 20–60 MPa. The aggregate of the invention provides excellent workability at low water/cement ratios so that good compaction is achieved. The coating on the aggregate assists in producing a solid matrix by reducing the amount of air in the concrete and also increases the bonding between the aggregate and the cement while reducing the susceptibility of the concrete to carbon dioxide. The density of various mixtures of concrete incorporating an aggregate of closed cell polystyrene balls (3–5 mm diameter) treated with the composition of Example 3, according to the invention is shown in Table 1.

Lightweight aggregate according to the invention may be used in other construction materials for example plaster. Example 9 is a lightweight plaster in which the aggregate is polystyrene beads coated with the formulation of Example 3. In accordance with the invention the quantities shown produce approximately 1 cubic meter of final plaster mix and a weight saving of approximately 25%.

| Example 9 | |
|---|---|
| Plaster/gypsum | 530 Kg |
| Water | 315 Kg |
| Lightweight aggregate according to the invention | 300 Liters |

Although the invention has been described with reference to the application of emulsions to polystyrene particles, it will be understood that the coating of the invention could be applied by other means for example from solution. The aggregate may be coated by any methods known in the coating art.

The invention described extends to include emulsions and solutions suitable for coating aggregate as described as well as to coated particles.

As will be apparent to those skilled in the art from the teaching hereof one ingredient may be substituted for another of similar performance characteristics and the relative proportions of the various components of the emulsion, the ratio of coating to aggregate, and of the aggregate in concrete may be varied without departing from the scope of the invention.

TABLE 1

| EXAMPLE NO: | TYPE A CEMENT (PORTLAND): (kg.) | SAND: (kg.) | 10 mm AGGREGATE (kg.) (stone, gravel) | AGGREGATE according to invention (lit.) | WATER (lit.) | COMPRESSIVE STRENGTH (Mpa:) | DENSITY (kg/cu · m) |
|---|---|---|---|---|---|---|---|
| 1 | 200 | — | — | 1000 | 80 | 0.5 | 300 |
| 2 | 350 | — | — | 900 | 140 | 2 | 500 |
| 3 | 350 | 180 | — | 850 | 140 | 4 | 700 |
| 4 | 350 | 420 | — | 800 | 140 | 8 | 1000 |
| 5 | 450 | 540 | — | 700 | 140 | 12 | 1200 |
| 6 | 450 | 430 | 300 | 700 | 150 | 15 | 1500 |
| 7 | 450 | 600 | 400 | 600 | 160 | 20 | 1700 |
| 8 | 550 | 600 | 450 | 500 | 190 | 25 | 1800 |

We claim:

1. A lightweight aggregate comprising free-flowing particles of polymer foam coated with a binding agent, said binding agent having dispersed therein in total at least 10% by weight thereof of one or more transition metal ions, wherein the transition metal ions are predominantly ferric ions.

2. An aggregate according to claim 1, wherein the transition metal ions dispersed in the binding agent are present as ferric oxide.

3. An aggregate according to claim 1 wherein the binding agent is selected from the group consisting of phenolic resins, shellac, epoxy resins, polyvinyl acetate, and bituminous binders.

4. An aggregate according to claim 3 wherein the binding agent is bituminous.

5. An aggregate according to claim 4 wherein the bituminous binding agent is a toluene soluble bituminous composition having a softening point of from 40° C. to 45° C.

6. An aggregate according to claim 1 wherein the binding agent is a mixture of phenolic and alkyl substituted aliphatic aromatic and hetero aromatic compounds of molecular weight range 500–1000.

7. An aggregate according to claim 1 wherein the particles of polymer foam are of expanded polystyrene foam.

8. An aggregate according to claim 7 wherein the particles have an average diameter of from 0.5 to 15 mm.

9. An aggregate according to claim 1 wherein the binding agent includes iron oxide in an amount of from 10 to 50% by weight of dry binder.

10. An emulsion for use in manufacture of a lightweight aggregate wherein said emulsion comprises an aqueous phase, a surfactant, and a dispersed phase comprising a binding agent, said emulsion also including a dispersion of transition metal ions in an amount in excess of 10% by dry weight, wherein the transition metal ions are ferric ions.

11. An emulsion according to claim 10 wherein the transition metal ions are present as a suspension of ferric oxide in the aqueous phase.

12. An emulsion according to claim 10 wherein the binding agent is selected from the group consisting of phenolic resins, shellac, epoxy resins, polyvinyl acetate, and bituminous binders.

13. An emulsion according to claim 10 wherein the binding agent is bituminous.

14. An emulsion according to claim 10 wherein the binding agent is a toluene soluble bituminous composition having a softening point of from 40° C. to 45° C.

15. An emulsion according to claim 10 wherein the surfactant is an anionic surfactant.

16. An emulsion according to claim 10 further including a viscosity modifying agent.

17. An emulsion according to claim 10 wherein the aqueous phase is from 40 to 60% by weight of the emulsion.

18. An emulsion according to claim 10 having a pH selected to be in the range of from 9 to 10.

19. Concrete comprising a lightweight aggregate according to claim 1.

20. Plaster board comprising a lightweight aggregate according to claim 1.

21. A method of manufacture of a lightweight aggregate comprising emulsifying a binder in an aqueous phase, dispersing a transition metal ion in the aqueous phase so that the emulsion comprises at least 10% by weight of solids of a transition metal ion comprising the ferric ion, and coating a lightweight porous aggregate with the emulsion.

22. A method according to claim 21 wherein the lightweight aggregate is polystyrene foam.

23. An aggregate according to claim 1 wherein said particles of polymer foam are formed from a closed cell foamed material.

24. An emulsion according to claim 10 wherein said surfactant is an emulsifying agent.

25. An emulsion according to claim 10 wherein said surfactant is a sodium lignosulfonate.

26. An emulsion according to claim 10 wherein said surfactant is a saponified resin anionic surfactant.

27. An emulsion according to claim 10 wherein the binding agent is a mixture of phenolic and alkyl substituted aliphatic aromatic and heteroaromatic compounds having a molecular weight range of 500 to 1000.

28. A method according to claim 21 wherein said ferric ion is present as ferric oxide.

29. A lightweight aggregate comprising free-flowing particles of polymer foam coated with a binding agent, said binding agent having dispersed therein, in total, at least 10% by weight thereof of one or more transition metal ions.

30. An emulsion for use in manufacture of a lightweight aggregate wherein said emulsion comprises an aqueous phase, a surfactant, and a dispersed phase comprising a binding agent, said emulsion also including a dispersion of transition metal ions in an amount in excess of 10% by dry weight.

31. A method of manufacture of a lightweight aggregate comprising emulsifying a binder in an aqueous phase, dispersing a transition metal compound in the aqueous phase so that the emulsion comprises at least 10% by weight of solids of a transition metal ion, and coating a lightweight porous aggregate with the emulsion.

* * * * *